United States Patent
Divi et al.

(10) Patent No.: US 10,633,257 B2
(45) Date of Patent: Apr. 28, 2020

(54) PROCESS FOR THE PREPARATION OF UNIFORM SIZED PHOSPHOR AEROGEL

(71) Applicant: COUNCIL OF SCIENTIFIC & INDUSTRIAL RESEARCH, New Delhi (IN)

(72) Inventors: Haranath Divi, Delhi (IN); Nahar Singh, Delhi (IN); Sneha Chawla, Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 284 days.

(21) Appl. No.: 15/612,540

(22) Filed: Jun. 2, 2017

(65) Prior Publication Data

US 2017/0349445 A1 Dec. 7, 2017

(30) Foreign Application Priority Data

Jun. 6, 2016 (IN) .............................. 201611019355

(51) Int. Cl.
| | |
|---|---|
| *C01B 33/158* | (2006.01) |
| *C09K 11/59* | (2006.01) |
| *C01B 25/37* | (2006.01) |
| *C01B 25/36* | (2006.01) |
| *C01B 25/26* | (2006.01) |

(52) U.S. Cl.
CPC ........ *C01B 33/1585* (2013.01); *C01B 25/265* (2013.01); *C01B 25/36* (2013.01); *C01B 25/372* (2013.01); *C09K 11/595* (2013.01)

(58) Field of Classification Search
CPC ....... C09K 11/59; C09K 11/595; C09K 11/06; C01B 33/1585
See application file for complete search history.

(56) References Cited

U.S. PATENT DOCUMENTS

| | | | |
|---|---|---|---|
| 2,188,007 A | 1/1940 | Kistler | |
| 2,316,079 A | 4/1943 | Loane et al. | |
| 4,873,218 A | 10/1989 | Pekala | |
| 5,795,557 A | 8/1998 | Pajonk et al. | |
| 5,985,176 A | 11/1999 | Rao | |

FOREIGN PATENT DOCUMENTS

| | | | |
|---|---|---|---|
| WO | WO 03/025087 | * | 3/2003 |

OTHER PUBLICATIONS

Translation of WO 03/025087, Mar. 27, 2003.*
Kistler, S.S., "Coherent expanded aerogels and jellies," Nature 127 (No. 3211), (May 16, 1931), p. 741.
Kistler, S.S., "Coherent expanded aerogels," J. Phys. Chem., 1932, 36(1), pp. 52-64; DOI: 10.1021/j150331a003; Publication Date: Jan. 1931.
Kistler, S.S., "Thermal conductivity of silica aërogel," Industrial and Engineering Chemistry 26(6): 658-662 (1934); DOI: 10.1021/ie50294a016.
Kutty, TRN, "Luminescence of $Ce^{3+}$-sensitized and $Dy^{3+}$-activated aluminoborates, $M_3Al_6B_8O_{24}$ (M=Ca, Ba)," Mat. Res. Bull 25:485-493 (1990).

\* cited by examiner

*Primary Examiner* — C Melissa Koslow
(74) *Attorney, Agent, or Firm* — Sterne, Kessler, Goldstein & Fox, P.L.L.C.

(57) ABSTRACT

The present invention provides a process for the preparation of phosphor aerogel of uniform size having high porosity, low density; high thermal insulation and high luminescence, which is useful for various applications like lighting, display, sensing and other applications. More specifically, the present invention provides a simple and versatile process for the formation of monolithic gel, at room temperature, which on further drying at supercritical temperature and pressure result in dry aerogel.

11 Claims, No Drawings

PROCESS FOR THE PREPARATION OF UNIFORM SIZED PHOSPHOR AEROGEL

FIELD OF THE INVENTION

The present invention relates to a process for the preparation of uniform sized phosphor aerogel. In particular, the present invention relates to the synthesis of uniform sized phosphor ($R_1$ $SiO_4$: $R_2$), wherein $R_1$ relates to host metal, $R_2$ relates to dopant (transition and rare-earth metals) using tetraethylorthosilicate (TEOS), transition metal salts and rare-earth metals in varying ratio as dopant in oxidizing, reducing and inert medium. More particularly, the present invention relates to phosphor aerogels having potential applications in display, lighting, insulating, catalytic, sensing devices and the like.

BACKGROUND PRIOR ART

Gel is considered as a semi-solid rich in solvent. It consists of 5-10% solid material in the form of a three-dimensional cross-linked network filled with the solvent. In general terminology, alcohol filled gel network is known as alcogel. Whereas an aerogel is a specific class of light weight porous solid material having air or gas in its pores instead of liquid, which is made possible using supercritical drying of alcogel. In the similar way, phosphor aerogel is a special class of luminescent material having narrow particle size distribution with remarkable luminescent properties useful for several strategic applications such as display, lighting, insulating, catalytic and sensing devices.

Synthesis of phosphor aerogel with controlled particle sizes, monolithic, crack free and near uniform luminescent properties is a challenging and tough task. No one has till date reported the preparation process for the same. The formation of cracks takes place during gel settling time and difficult to form monolithic gel.

In the last few decades several processes have been claimed worldwide for the synthesis of phosphor and aerogels separately for various applications including lighting, display and insulated devices.

Reference may be made to Kistler, S. S., 1931 Nature, Vol. 127, page 741. Discovery of Aerogels: *Coherent expanded aerogels and jellies*, wherein it is suggested that solvent in a gel could be replaced by much rarer medium (i.e. gas) with little or no shrinkage. For the synthesis of gas filled gels the solvent from gels was displaced by other solvents of low critical point. In the process, the gel (containing low critical temperature and pressure conditions of the solvent) was placed in an autoclave with an excess of solvent, and temperature was raised above its critical point to get gas filled gel (aerogel). The processes of the prior art are: (i) enormously time consuming, (ii) involve multiple steps, (iii) involve change of multiple solvents from higher to lower critical conditions, (iv) have less probability of resulting into monolithic (single piece) gels without cracks, etc. However, the present invention overcomes all the above-mentioned drawbacks.

Reference may be made to Kistler, S. S., 1932. Journal of Physical Chemistry, Vol. 36, pages52 -64. *First Synthesis of Organic and metal oxide aerogels: Coherent expanded aerogels*, wherein it is reported that aerogels of $SiO_2$, $Al_2O_3$, $WO_3$, $Fe_2O_3$, $SnO_2$, Ni tartrate, cellulose, nitrocellulose, gelatin, agar and egg albumin can be made following the procedure cited in his 1931 reference. The drawbacks associated with the said prior art are similar to the above reference (Kistler, S. S., 1931 Nature. Vol. 127, page 741.) as the preparation procedure is same. However, the present invention overcomes all the above-mentioned drawbacks.

Reference may be made to U.S. Pat. No. 2,188,007, wherein recited is the process for the synthesis of inorganic aerogel compositions, which provides the synthesis (economical) and advantages of aerogels, as depicted by the earlier two papers of the same inventor.

Reference may be made to U.S. Pat. No. 4,873,218, wherein it is recited that the poly-condensation of resorcinol with formaldehyde under alkaline conditions results in the formation of surface functionalized polymer "clusters". The covalent cross linking of these "clusters" produces gels which when processed under supercritical conditions, produce low density, organic aerogels (density ≤100 mg/cc; cell size ≤0.1 microns). The aerogels are transparent, dark red in color and consist of interconnected colloidal-like particles with diameters of about 100 Å. The said patent deals with the preparation of organic aerogels and upon heating to 600° C.-1200° C. resulted in carbon foam. The aforesaid process includes many tedious steps and suffers from several drawbacks/limitations associated with the said prior art. However, the present invention has few steps and upon heating to similar temperature range results in oxide based aerogels.

A large number of papers have proposed for the synthesis of aerogels and phosphors separately. In general, aerogels are produced using sol-gel process in which the solvent is extracted in order to obtain a porous (>90%) texture of very low density (<100 kg m$^{-3}$).

Reference may be made to U.S. Pat. No. 5,795,557, in which silica aerogels have been synthesized for high thermal insulation properties by modifying earlier method of Kistler by introducing gazing sector in gels using silicone oils. The drawbacks associated with the said prior art involves (i) the presence of highly viscous silicone oils during preparation, (ii) use of liquid $CO_2$ instead of polar solvents in the autoclave, and (iii) HF has been used as a catalyst during the preparation of gels. However, the present invention does not involve use of any oils, hazardous catalysts or expensive solvents ha during preparation and autoclaving of the gels.

Reference may be made to Kistler, S. S., 1934. Journal of Industrial Engineering and Chemistry, Vol. 26, pages 658-662. *Identification of the ultralow thermal conductivity of aerogels: Thermal conductivity of aerogels*, wherein the heat conductivity of the aerogels have been measured under variable mechanical and air pressure, and it is suggested that silica aerogels have lowest heat conductivity at atmospheric pressure in comparison with any other insulators. The main drawback associated with the said prior art is the usage of dichlorodifluoromethane ($CCl_2F_2$) during the preparation and autoclaving procedures. This chemical is well-known for ozone depletion and hence restricted in many countries. However, the present invention does not involve use of any restricted chemicals that affects environment.

Reference may be made to T. R. N. Kutty: Mater. Res. Bull; 1990, Vol. 25, page 485, wherein it is suggested that sol-gel process produces sub-micron sized particles having the same morphology. To get particles of lower sizes (<micron) in a solid state process, grinding, crushing and milling techniques are preferred. However, in a solid state process it is difficult to control the morphology of the particles and also the efficiency reduces drastically. Moreover, in the present invention no such solid-state processes were used to get the uniform particle size.

Reference may be made to U.S. Pat. No. 2,316,079, wherein it is proposed to prepare water dispersible alumina aerogels that form stable colloidal dispersions or solutions having unique properties. The drawbacks associated with the said prior art are (i) lack of transparency in the visible region, and (ii) water dispersibility. The present invention overcomes this and provideshighly transparent wet gels which are not water dispersible.

Reference may be made to U.S. Pat. No. 5,985,176, wherein recited is a process of synthesis of zinc silicate carried out at low temperature than a normal solid state reaction proposed earlier. The main drawbacks associated with the said prior art are (i) the extended time period (few days) required for formation of wet gels, (ii) followed by drying at ambient temperature and pressures to have xerogels. However, the present invention requires reduced amount of time i.e. few hours for the formation of gels and drying was performed in autoclave under supercritical conditions of the polar solvent.

In short, it may be summarized that all the above processes suggested how to synthesize phosphors and aerogels separately, but no patents and processes deal about how to synthesize phosphor aerogels (intrinsic as well doped) solids having luminescence, high porosity, low density and high thermal insulating properties.

Thus, keeping in view the drawbacks of the hitherto reported prior art, the inventors of the present invention realized that there exists a dire need to provide a process (sol gel followed by annealing) for the bulk preparation of phosphor aerogels of uniform size distribution having luminescence, high porosity, low density and high thermal insulating properties.

Objectives of the Invention

The main objective of the present invention is thus to provide a simple and economical process for the preparation of phosphor aerogels having optimal luminescence, high porosity (>90%), low density (<200 kg m$^{-3}$) and high thermal insulating properties.

Another objective of the present invention is to provide a process for controlling the size (5±2 nm) of particles of phosphor aerogel.

Still another objective of the present invention is to provide a process for the preparation of aerogels without using any costly equipments and also to reduce the density of the devices after utilizing the proposed material.

Yet another objective of the present invention is to provide a simple and versatile process for the formation of monolithic, crack-free gels.

Still another objective of the present invention is to provide a process that result in bulk and commercial synthesis of phosphor aerogels with controlled size distribution.

SUMMARY OF THE INVENTION

The present invention provides a process for the preparation of phosphor aerogel of uniform size having high porosity, low density; high thermal insulation and highly luminescence, useful for various applications like lighting, display, sensing and other applications.

In the present invention, a simple and versatile process for the formation of monolithic gel, at room temperature, which on further drying at supercritical temperature and pressures result in dry aerogel is disclosed. Further, annealing under mild reduced atmosphere from 1000°-1400° C. not only retains the porous network with uniform size particles but also crystallizes to form a phosphor aerogel having brightest luminescence with bulk density as low as 100 kg m$^{-3}$, and strong enough to support a weight much higher than its own weight.

In an embodiment, the present invention relates to the synthesis of uniform sized phosphor aerogels ($R_1$ $SiO_4$: $R_2$), wherein $R_1$ relates to host metal, $R_2$ relates to dopant (transition and rare-earth metals) using tetraethylorthosilicate (TEOS), transition metal salts and rare-earth metals in varying ratio as dopant in oxidizing, reducing and inert medium.

In another embodiment, the present invention provides a process for the preparation of a uniformly sized phosphor aerogel comprising the steps of:

a) dissolving the alkoxide: transition metal salt and/or alkaline earth metal salt: dopant: polar solvent: demineralized water in molar ratio ranging from 1: 1-2: 1-20: 5-10: 4-10 to obtain a clear transparent solution that forms a wet gel within 30 min to 5 hours;

b) the wet gel obtained in step (a) to supercritical drying in an autoclave for 5-6 hours at a temperature ranging from 250° C. to 300° C. at 60-120 bars pressure to obtain a dried aerogel followed by flushing with nitrogen gas 2-3 times to remove adsorbed solvent molecules from the pores of the dried aerogel;

c) subjecting the dried aerogel as obtained in step (b) to an annealing treatment in a controlled atmosphere of a high temperature furnace at a temperature in the range of 800° C. to 1500° C. for 1-5 hours so as to obtain the desired phosphor aerogel.

In still another embodiment of the present invention, the molar ratio of alkoxide: transition metal salt and/or alkaline earth metal salt:dopant:polar solvent:demineralized water is 1:1-2:1-20:10:4, which has the shortest gelation time.

In still another embodiment, the present invention provides a high >95% yield of a visible and/or near infrared color-emitting phosphor aerogel. Examples of color that can be emitted by the phosphor aerogel include violet, indigo, blue, green, yellow, orange, red. These can be used for luminescence applications.

In yet another embodiment, the present invention provides Phosphor aerogels obtained by the aforesaid process.

In still another embodiment of the present invention, the Phosphor aerogels have particle size in the range of 5-25 nm within ±2 nm size distribution.

In yet another embodiment of the present invention, the Phosphor aerogels have high porosity of >90% and low density of <100 kg m$^{-3}$.

In still another embodiment of the present invention, the Phosphor aerogels are in the form of powder or in the form of desired shapes selected from square, rectangular, cylindrical, circular etc.

In yet another embodiment of the present invention, the Phosphor aerogels are useful in light weight insulated display devices.

In still another embodiment of the present invention, the Phosphor aerogels emit wide range of colors in the visible and/or near infrared range from 400-1500 nm when excited by ultra violet light having wavelength in the range of 200 to 400 nm.

In yet another embodiment of the present invention, the Phosphor aerogels exhibit thermal insulating properties.

In a further embodiment of the present invention, silicon, aluminum, titanium, zirconium, gallium, boron etc. containing alkoxides are selected as precursors such as tetra methylorthosilicates (TMOS), tetraethylorthosilicate (TEOS), aluminum isopropoxide, titanium isopropoxide, zirconium isopropoxide, gallium isopropoxide.

In another embodiment of the present invention, the polar solvents are selected from the group consisting of methanol, ethanol, isopropyl alcohol, acetone, demineralised water.

In still another embodiment of the present invention, the transition metals and/or alkaline earth metals are selected from the group consisting of zinc, cadmium, nickel, beryllium, magnesium, calcium, strontium and barium.

In yet another embodiment of the present invention, the dopant is a soluble salt of transition metal and/or rare-earth metal selected from the group consisting of manganese, copper, silver, cobalt, cerium, praseodymium, neodymium, samarium, europium, gadolinium, terbium, dysprosium, holmium, erbium, thulium and ytterbium.

In still another embodiment of the present invention, the concentration of dopant is 1-20 molar parts to 1-2 molar parts of the precursor salt.

In yet another embodiment of the present invention, several molar ratios of (alkoxide): (transition metal salt and/or alkaline earth metal salt):(dopant):(polar solvent): (demineralized water) are used such as 1:(1-2):(1-20):(5-10):(4-10}. However, the preferred molar ratio is 1:(1-2):(1-20}:10:4, which has the shortest gelation time.

In still another embodiment of the present invention, the gelation time varies from 30 mins to 5 hours.

In yet another embodiment of the present invention, the temperature for autoclaving the wet gels ranges from 250° C. to 300° C. for 5-6 hours and pressure ranges from 60 to 120 bars.

In still another embodiment of the present invention, the aerogels thus obtained are annealed under controlled atmosphere at 800° C. to 1500° C. in a high temperature furnace for 1 to 5 hours.

In yet another embodiment of the present invention, the controlled atmosphere used are (i) inert environment such as nitrogen gas, argon gas etc.; (ii) reducing environment such as ammonia, hydrogen, borohydride, hydrazine hydrate etc.; and (iii) oxidizing environment such as air, oxygen gas, acidic medium etc.

In still another embodiment of the present invention, the phosphor aerogels are of size 6-20 nm within ±2 nm size distributions.

In yet another embodiment of the present invention, the synthesized phosphor aerogels have high porosity (>90%) and low density (<100 kg m$^{-3}$).

In still another embodiment of the present invention, the synthesized phosphor aerogels are in the form of powder or in the form of desired shapes and sizes such as square, cylindrical, circular etc.

In yet another embodiment of the present invention, the synthesized phosphor aerogels have applications in the field of light weight insulated display devices.

In still another embodiment of the present invention, the process claims high (>95%) yield of several color-emitting phosphor aerogels including blue, green, red, orange for luminescence applications.

In yet another embodiment of the present invention, the synthesized phosphor aerogels exhibit thermal insulating properties.

DETAILED DESCRIPTION OF THE INVENTION

The present invention provides a process of making a phosphor aerogel of uniform size particle distribution, high porosity, low density; high thermal insulation and enhanced luminescence characteristics.

For the preparation of phosphor aerogel of uniform size distribution, a metal alkoxide, soluble salts of a transition metal/alkaline-earth metal and dopants were dissolved in a polar solvent and demineralized water in an appropriate ratio to obtain a clear solution, which was then allowed to stand for 30 min to 5 hours to form a wet gel. The wet gel was then autoclaved under supercritical conditions and solvent was removed slowly to obtain a dried aerogel. The dried aerogel was then subjected to annealing treatment to get the desired phosphor aerogel.

More specifically, in the first step the metal alkoxide was diluted in a known quantity of polar solvent and stirred thoroughly. The polar solvent was chosen from the group consisting of methanol, ethanol, isopropyl alcohol, acetone, demineralised water and the like.

In another vessel, precursor salts were dissolved in a known quantity of polar solvent to obtain a clear solution. The precursor salts were chosen from the group consisting of transition metal salts and/or alkaline earth metal salts.

In yet another vessel, dopant was dissolved in known quantity of demineralised water to obtain a clear solution. The dopants are chosen from the group of transition metal salts and/or rare-earth metal salts.

In the second step, all the above prepared clear solutions were mixed thoroughly in a single vessel and poured into templates of the desired shape and size. This template was kept at ambient conditions for an optimized period to form a transparent monolithic wet gel.

The third step involved the supercritical drying of wet gel. The aim of this step was to remove the solvent entrapped in the three-dimensional network of the wet gel without collapsing the network structure. Drying the wet gels at ambient conditions lead to cracks, hence the supercritical drying is a must to retain the monolithicity and original shape of the wet gel. The presence of the capillary forces collapses the structure of the wet gel during the process of drying. The desiccation of the solvent under supercritical conditions makes it possible to eliminate the capillary forces generated due to the surface tension of the solvent. To carry out this step an autoclave set-up is required, which was loaded with wet gels immersed in a fixed volume of polar solvent. The nitrogen gas flushing for 2-3 times is an essential step to remove the traces of oxygen present inside the autoclave. The temperature of the autoclave was then raised in a linear progression until it exceeds the critical temperature and vapor pressure of the polar solvent. By maintaining the temperature above the critical point, the solvent from the autoclave was desiccated to atmospheric pressure using a micro-release valve. The autoclave was flushed again with nitrogen gas to eliminate traces of vapors from the vessel. Finally, a dried monolithic aerogel was obtained.

In the fourth step, the dried aerogel obtained in the third step was subjected to annealing treatment in the high temperature furnaces having controlled atmosphere for few hours. After cooling to room temperature, the required phosphor aerogel was obtained.

More specifically, the method comprises reacting the silicon, aluminum, titanium, zirconium, gallium, boron etc. containing alkoxides with transition metal salts, alkaline earth metal salts and/or rare-earth metal salts in a polar solvent and demineralized water in an appropriate ratio to obtain a clear solution, which was allowed to stand for a sufficiently long time to form a wet gel. The gelation time ranges from about 30 minutes to 5 hours depending upon the room temperature. The wet gels thus formed were dried supercritically for 5-6 hours at temperature in the range of 250° C. to 300° C. and pressure in the range of 60-120 bars to obtain dried aerogels. Further, these aerogels were annealed at 800° C. to 1500° C. for 1-5 hours in a high temperature furnace having controlled atmosphere and characterized in terms of its surface morphology, particle size distribution and photoluminescence properties.

The finished product namely phosphor aerogel emits wide range of colors in the visible and/or near infrared range from 400-1500 nm when excited by ultra violet (UV) light ranging from 200 to 400 nm.

EXAMPLES

The following examples are given by way of illustration and therefore should not be construed to limit the scope of the present invention in any manner.

Example 1

Zinc Silicate Doped Managanese ($Zn_{2-x}Mn_xSiO_4$)

In the first set of experiments for the synthesis of phosphor aerogels represented by the formula $Zn_{2-x}Mn_xSiO_4$ the gel was prepared as follows: In the first step, 1 mol % of tetraethylorthosilicate (TEOS) was diluted in 5 mol % of ethanol and stirred thoroughly. In another vessel, zinc chloride (1-2 mol %) was dissolved in 5 mol % of ethanol to obtain a clear solution. In yet another vessel, manganese chloride (1-5 mol %) was dissolved in 4-10 mol % of demineralized water to obtain a clear solution.

In the second step, all the above prepared clear solutions were mixed thoroughly in a single vessel and poured into templates of the desired shape and size. This template was kept at ambient conditions for 30 min to 5 hours to form a transparent monolithic wet gel.

The third step involved the supercritical drying of wet gel to form a dried monolithic aerogel. The wet gel was autoclaved for 4-5 hours at temperature 265° C. and 70-80 bars pressure and slowly evacuated the solvent to obtain crack-free dried aerogel. The dried aerogels were further subjected to nitrogen gas flushing for 2-3 times to remove adsorbed solvent molecules from the pores of dried aerogels, if any.

In the fourth step, the dried aerogel obtained in the third step was subjected to annealing treatment at 1000° C. for 3-5 hours in a reducing atmosphere. After cooling to room temperature, the required $Zn_{2-x}Mn_xSiO_4$ phosphor aerogel was obtained. The finished product emitted bright green (~540 nm) luminescence when exited by UV light (253 nm).

Example 2

Zinc Silicate Doped Europium ($Zn_{2-x}Eu_xSiO_4$)

In the second set of experiments for the synthesis of phosphor aerogels represented by the formula $Zn_{2-x}Eu_xSiO_4$, the gel was prepared as follows:

In the first step, 1 mol % of tetraethylorthosilicate (TEOS) was diluted in 5 mol % of ethanol and stirred thoroughly. In another vessel, zinc chloride (1-2 mol %) was dissolved in 5 mol % of ethanol to obtain a clear solution. In yet another vessel, europium chloride (5-12 mol %) was dissolved in 4-10 mol % of demineralized water to obtain a clear solution.

In the second step, all the above prepared clear solutions were mixed thoroughly in a single vessel and poured into templates of the desired shape and size. This template was kept at ambient conditions for 30 min to 5 hours to form a transparent monolithic wet gel.

The third step involved the supercritical drying of wet gel to form a dried monolithic aerogel. The wet gel was autoclaved for 4-5 hours at temperature 265° C. and 70-80 bars pressure followed by solvent evacuation to obtain crack-free dried aerogel. The dried aerogels were further subjected to nitrogen gas flushing for 2-3 times to remove adsorbed solvent molecules from the pores of dried aerogels, if any.

In the fourth step, the dried aerogel obtained in the third step was subjected to annealing treatment at 1300° C. for 3-5 hours in a reducing atmosphere. After cooling to room temperature, the required $Zn_{2-x}Eu_xSiO_4$ phosphor aerogel was obtained. The finished product emits red (611 nm) luminescence when exited by UV light (365 nm).

Example 3

Strontium Silicate Doped Europium ($Sr_{2-x}Eu_xSiO_4$)

In the third set of experiments for the synthesis of phosphor aerogels represented by the formula $Sr_{2-x}Eu_xSiO_4$ the gel was prepared as follows:

In the first step, 1 mol % of tetraethylorthosilicate (TEOS) was diluted in 5 mol % of ethanol and stirred thoroughly. In another vessel, strontium chloride (1-2 mol %) was dissolved in 5 mol % of ethanol to obtain a clear solution. In yet another vessel, europium chloride (5-12 mol %) was dissolved in 4-10 mol % of demineralized water to obtain a clear solution.

In the second step, all the above prepared clear solutions were mixed thoroughly in a single vessel and poured into templates of the desired shape and size. This template was kept at ambient conditions for 30 min to 5 hours to form a transparent monolithic wet gel.

The third step involved the supercritical drying of wet gel to form a dried monolithic aerogel. The wet gel was autoclaved for 4-5 hours at temperature 265° C. and 70-80 bars pressure followed by slow evacuation of the solvent to obtain crack-free dried aerogel. The dried aerogels were further subjected to nitrogen gas flushing for 2-3 times to remove adsorbed solvent molecules from the pores of dried aerogels, if any.

In the fourth step, the dried aerogel obtained in the third step was subjected to annealing treatment at 1300° C. for 3-5 hours in a reducing atmosphere. After cooling to room temperature, the required $Sr_{2-x}Eu_xSiO_4$ phosphor aerogel was obtained. The finished product emits orange-red (595 nm) luminescence when exited by UV light (390 nm).

Example 4

Barium Silicate Doped Europium ($Ba_{2-x}Eu_xSiO_4$)

In the fourth set of experiments for the synthesis of phosphor aerogels represented by the formula $Ba_{2-x}Eu_xSiO_4$, the gel was prepared as follows:

In the first step, 1 mol % of tetraethylorthosilicate (TEOS) was diluted in 5 mol % of ethanol and stirred thoroughly. In another vessel, barium chloride (1-2 mol %) was dissolved in 5 mol % of ethanol to obtain a clear solution. In yet another vessel, europium chloride (5-12 mol %) was dissolved in 4-10 mol % of demineralized water to obtain a clear solution.

In the second step, all the above prepared clear solutions were mixed thoroughly in a single vessel and poured into templates of the desired shape and size. This template was kept at ambient conditions for 30 min to 5 hours to form a transparent monolithic wet gel.

The third step involved the supercritical drying of wet gel to form a dried monolithic aerogel. The wet gel was autoclaved for 4-5 hours at temperature of 265° C. and 70-80 bars pressure followed by slow evacuation of the solvent to obtain crack-free dried aerogel. The dried aerogels were further subjected to nitrogen gas flushing for 2-3 times to remove adsorbed solvent molecules from the pores of dried aerogels, if any.

In the fourth step, the dried aerogel obtained in the third step was subjected to annealing treatment at 1300° C. for 3-5 hours in a reducing atmosphere. After cooling to room temperature, the required $Ba_{2-x}Eu_xSiO_4$ phosphor aerogel was obtained. The finished product emitted blue-green (500 nm) luminescence when exited by UV light (365 nm).

ADVANTAGES OF THE INVENTION

The process is repeatable in wide range, and same process can be used for bulk synthesis of three primary colored (red, blue, green) phosphor aerogels.

The process is cost effective with high yield (>95%) and there is no requirement of costly equipment.

The proposed process can be used for the commercial production of phosphor aerogels of desired colors.

The process provides excellent control on morphology and particles sizes in comparison to several other processes cited in the literature.

The proposed material synthesized can be used for several industrial applications due to its high porosity, light weight, insulating, and luminescent properties.

The process provides excellent control on desired shape and sizes (square, cylindrical, circular etc.) or in powder form of the phosphor aerogels for various applications.

We claim:

1. A process for the preparation of a uniformly sized phosphor aerogel comprising:
   (a) dissolving an alkoxide, a transition metal salt and/or alkaline earth metal salt, a dopant, a polar solvent, and demineralized water in molar ratio ranging from 1: 1-2:1-20: 5-10: 4-10 to obtain a clear transparent solution that forms a wet gel within 30 min to 5 hours, and optionally forming the gel into a desired shape or size;
   (b) subjecting the wet gel obtained in step (a) to supercritical drying in an autoclave for 5-6 hours at a temperature ranging from 250° C. to 300° C. at 60-120 bars pressure to obtain a dried aerogel followed by flushing with nitrogen gas 2-3 times to remove adsorbed solvent molecules from the pores of the dried aerogel;
   (c) subjecting the dried aerogel as obtained in step (b) to an annealing treatment in a controlled atmosphere of a high temperature furnace at a temperature in the range of 800° C. to 1500° C. for 1-5 hours so as to obtain the desired phosphor aerogel.

2. The process as claimed in claim 1, wherein the molar ratio of alkoxide, transition metal salt and/or alkaline earth metal salt, dopant, polar solvent and demineralized water is 1:1-2:1-20:10:4.

3. The process as claimed in claim 1, wherein the said process yields a phosphor aerogel that emits a color selected from the group consisting of violet, indigo, blue, green, yellow, orange and red.

4. The process as claimed in claim 1, wherein the polar solvent is selected from the group consisting of methanol, ethanol, isopropyl alcohol, acetone and demineralized water.

5. The process as claimed in claim 1, wherein the transition metal and/or alkaline earth metal is selected from the group consisting of zinc, cadmium, nickel, beryllium, magnesium, calcium, strontium and barium.

6. The process as claimed in claim 1, wherein the dopant is a soluble salt of transition metal and/or rare-earth metal selected from the group consisting of manganese, copper, silver, cobalt, cerium, praseodymium, neodymium, samarium, europium, gadolinium, terbium, dysprosium, holmium, erbium, thulium and ytterbium.

7. The process as claimed in claim 1, wherein the dopant's concentration is 1-20 molar parts to 1-2 molar parts of a precursor salt that is a transition metal or alkaline earth metal salt selected from the group consisting of zinc, cadmium, nickel, beryllium, magnesium, calcium, strontium and barium.

8. The process as claimed in claim 1, wherein the wet gel is autoclaved at a temperature from 250° C. to 300° C. for 5-6 hours and a pressure of from 60 to 120 bars.

9. The process as claimed in claim 1, wherein the aerogel is annealed under a controlled atmosphere at a temperature ranging from 800° C. to 1500° C. in a high temperature furnace for 1 to 5 hours.

10. A phosphor aerogel obtained by the process as claimed in claim 1, having a particle size of 5-25 nm within a ±2 nm size distribution, a high porosity of >90% and a low density of <100 kg m$^{-3}$, and exhibiting thermal insulating properties, wherein the phosphor aerogel emits a color in the visible and/or near infrared range from 400-1500 nm when excited by ultraviolet light having a wavelength in the range of 200 to 400 nm.

11. The phosphor aerogel as claimed in claim 10, wherein the phosphor aerogel is in the form of a powder or is in the form of a shape selected from the group consisting of a square, rectangular, cylindrical and circular shape.

* * * * *